(12) United States Patent
Gali et al.

(10) Patent No.: US 11,336,805 B2
(45) Date of Patent: *May 17, 2022

(54) METHOD OF CALIBRATING A VEHICULAR TRAILERING ASSIST SYSTEM

(71) Applicant: Magna Electronics Inc., Auburn Hills, MI (US)

(72) Inventors: Jyothi P. Gali, Rochester Hills, MI (US); Nikhil Gupta, Brampton (CA); Galina Okouneva, Markham (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/858,834

(22) Filed: Apr. 27, 2020

(65) Prior Publication Data
US 2020/0259976 A1     Aug. 13, 2020

Related U.S. Application Data

(63) Continuation of application No. 16/441,220, filed on Jun. 14, 2019, now Pat. No. 10,638,025, which is a
(Continued)

(51) Int. Cl.
*G06K 9/00* (2022.01)
*H04N 5/225* (2006.01)
(Continued)

(52) U.S. Cl.
CPC ......... *H04N 5/2253* (2013.01); *B62D 15/029* (2013.01); *G06T 7/248* (2017.01);
(Continued)

(58) Field of Classification Search
CPC ........ B60Q 9/008; B62D 13/00; B62D 13/06; B62D 15/029; G06K 2209/23;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

*Primary Examiner* — Xin Jia
(74) *Attorney, Agent, or Firm* — Honigman LLP (57) ABSTRACT

A method of calibrating a vehicular trailering assist system includes hitching a trailer to a vehicle having a rearward viewing camera. Frames of image data are captured by the camera when the vehicle is towing the trailer hitched to the vehicle to determine presence of the trailer and to determine if the particular trailer is a trailer for which the system is calibrated. Responsive to determination that the particular trailer is not a trailer for which the system is calibrated, the system assigns an initial trailer beam length before starting a calibration drive and collects data during the calibration drive. The system iteratively estimates the trailer beam length and, when the predicted trailer angle least deviates from the current determined trailer angle during the calibration drive, the system determines a final estimated trailer beam length for use by the vehicular trailering assist system in determining trailer angles.

27 Claims, 8 Drawing Sheets

Related U.S. Application Data continuation-in-part of application No. 15/928,128, filed on Mar. 22, 2018, now Pat. No. 10,552,976.

(60) Provisional application No. 62/685,309, filed on Jun. 15, 2018, provisional application No. 62/518,765, filed on Jun. 13, 2017, provisional application No. 62/474,646, filed on Mar. 22, 2017.

(51) Int. Cl.
| | |
|---|---|
| *B62D 15/02* | (2006.01) |
| *G06T 7/80* | (2017.01) |
| *G06T 7/246* | (2017.01) |
| *G06T 7/60* | (2017.01) |
| *B60Q 9/00* | (2006.01) |
| *G06V 20/56* | (2022.01) |

(52) U.S. Cl.
CPC .................. *G06T 7/60* (2013.01); *G06T 7/80* (2017.01); *B60Q 9/008* (2013.01); *G06T 2207/30252* (2013.01); *G06V 20/56* (2022.01); *G06V 2201/08* (2022.01)

(58) Field of Classification Search
CPC ...... G06K 9/00791; G06T 2207/30252; G06T 7/248; G06T 7/60; G06T 7/80; H04N 5/2253
See application file for complete search history.

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 8,930,140 B2 | 1/2015 | Trombley et al. |
| 9,085,261 B2 | 7/2015 | Lu et al. |
| 9,296,422 B2 | 3/2016 | Lavoie |
| 9,446,713 B2 | 9/2016 | Lu et al. |
| 9,558,409 B2 | 1/2017 | Pliefke et al. |
| 10,552,976 B2 | 2/2020 | Diessner et al. |
| 10,638,025 B2 | 4/2020 | Gali et al. |
| 2014/0085472 A1* | 3/2014 | Lu ........................... B60R 1/002 348/148 |
| 2014/0160276 A1 | 6/2014 | Pliefke et al. |
| 2014/0200759 A1 | 7/2014 | Lu et al. |
| 2014/0297129 A1 | 10/2014 | Lavoie et al. |
| 2014/0303849 A1 | 10/2014 | Hafner et al. |
| 2015/0002670 A1 | 1/2015 | Bajpai |
| 2015/0217693 A1 | 8/2015 | Pliefke et al. |
| 2016/0039456 A1* | 2/2016 | Lavoie ..................... B60D 1/62 701/41 |
| 2017/0050672 A1 | 2/2017 | Gieseke et al. |
| 2017/0217372 A1 | 8/2017 | Lu et al. |
| 2017/0254873 A1 | 9/2017 | Koravadi |
| 2017/0297619 A1* | 10/2017 | Lavoie ................. B62D 15/024 |
| 2017/0341583 A1 | 11/2017 | Zhang et al. |
| 2017/0349213 A1* | 12/2017 | Abdel-Rahman .... B62D 15/025 |
| 2018/0001928 A1* | 1/2018 | Lavoie ..................... B60D 1/62 |
| 2018/0068447 A1 | 3/2018 | Prasad et al. |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |

* cited by examiner

- The operation is divided into four phases or states:
  - Initialization state
  - Recognition of a Newly Attached Trailer
  - New Trailer Calibration (if needed)
  - Steady-State Running

METHOD OF CALIBRATING A VEHICULAR TRAILERING ASSIST SYSTEM

CROSS REFERENCE TO RELATED APPLICATIONS

The present application is a continuation of U.S. patent application Ser. No. 16/441,220, filed Jun. 14, 2019, now U.S. Pat. No. 10,638,025, which claims the filing benefits of U.S. provisional application Ser. No. 62/685,309, filed Jun. 15, 2018, which is hereby incorporated herein by reference in its entirety. And U.S. patent application Ser. No. 16/441,220 is a continuation-in-part of U.S. application Ser. No. 15/928,128, filed Mar. 22, 2018, now U.S. Pat. No. 10,552,976, which claims the filing benefits of U.S. provisional application Ser. No. 62/518,765, filed Jun. 13, 2017, and U.S. provisional application Ser. No. 62/474,646, filed Mar. 22, 2017, which are all hereby incorporated herein by reference in their entireties.

FIELD OF THE INVENTION

The present invention relates generally to a vehicle vision system for a vehicle and, more particularly, to a vehicle vision system that utilizes one or more cameras at a vehicle to assist a driver of the vehicle in maneuvering the vehicle with a trailer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. In some systems, when attaching a trailer to the vehicle, the driver has to enter its properties to put the trailer driving aid system into a position to properly calculate the driving aids overlays, when backing up with a trailer attached. Examples of trailer detection systems are described in U.S. Pat. Nos. 9,296,422 and 8,930,140, and U.S. Publication No. US-2014-0160276, which are hereby incorporated herein by reference in their entireties.

SUMMARY OF THE INVENTION

The present invention provides a driver assistance system or vision system or imaging system or trailering assist system or trailer angle detection system for a vehicle that utilizes one or more cameras (preferably one or more CMOS cameras) to capture image data representative of images exterior of the vehicle, with the vehicle towing a trailer, and with the system determining the trailer angle of the trailer relative to the vehicle. The system determines the presence of a trailer at the rear of the vehicle and attached at or hitched to the vehicle and determines the length of the trailer beam during an initial calibrating drive when the trailer is attached at or hitched to the vehicle. The system determines which estimated trailer beam length corresponds with an estimated trailer angle that least deviates from the determined trailer angle (as determined at least in part responsive to processing of image data captured by the rearward viewing camera) and selects that estimated trailer beam length as the final trailer beam length for that trailer. The final trailer beam length is used in determining trailer angles for that particular trailer during future drives of the vehicle when towing that particular trailer.

These and other objects, advantages, purposes and features of the present invention will become apparent upon review of the following specification in conjunction with the drawings.

DESCRIPTION OF THE PREFERRED EMBODIMENTS

Figure 1:
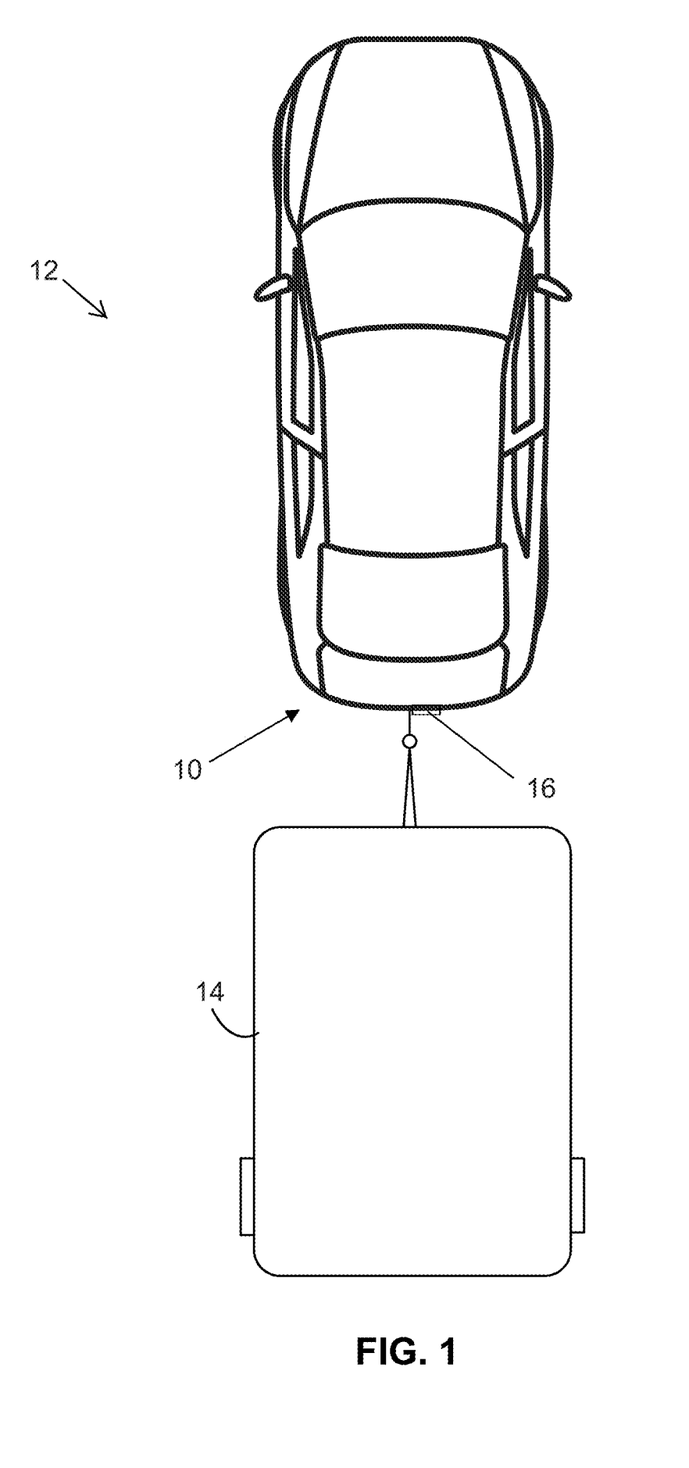
FIG. 1 is a plan view of a vehicle with a vision system that incorporates a camera for capturing image data representative of a trailer being towed by the vehicle.
Figure 2:
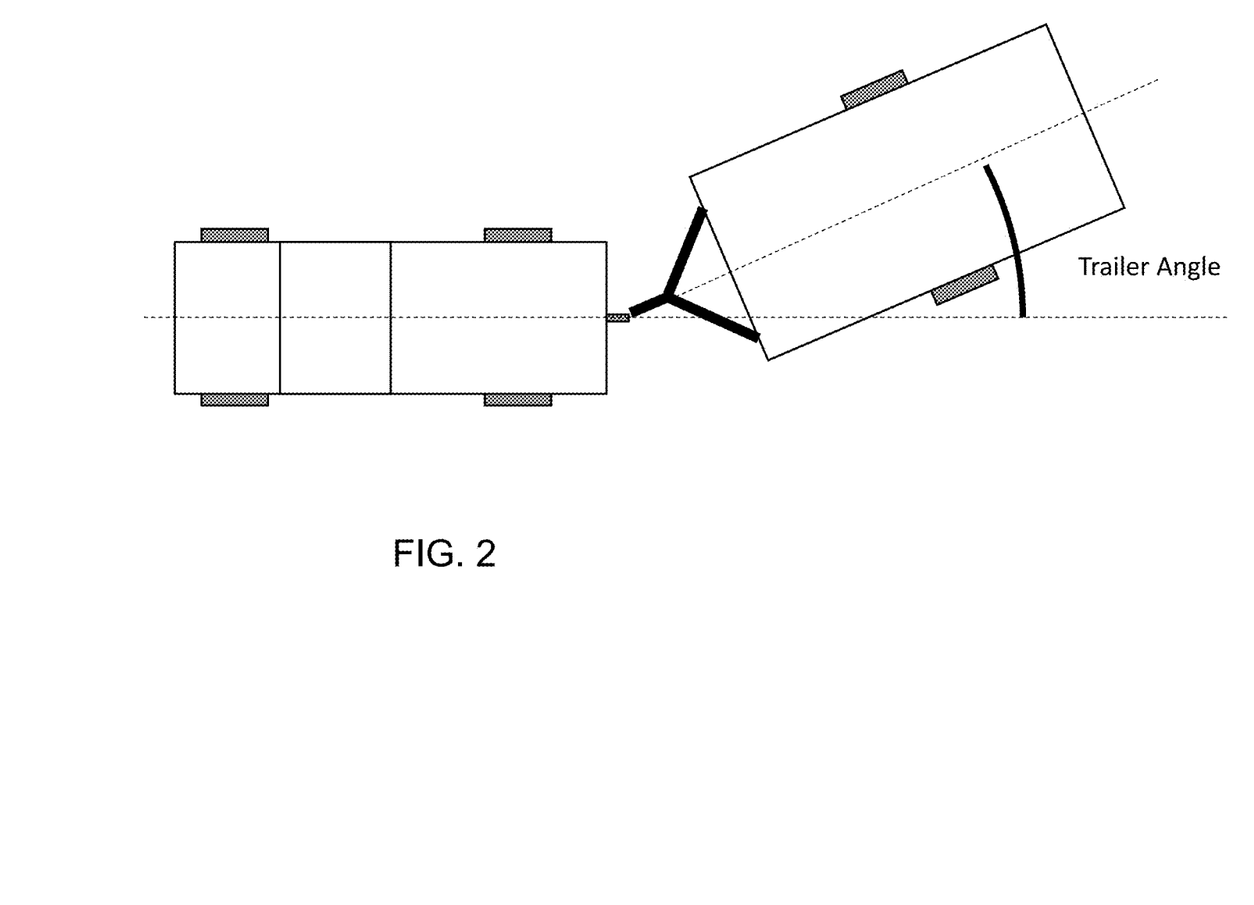
FIG. 2 is a plan view of the vehicle and trailer, showing the trailer angle of the trailer relative to the vehicle.

Referring now to the drawings and the illustrative embodiments depicted therein, a trailering assist system 10 for a vehicle 12 is operable to detect a trailer angle of a trailer 14 that is pulled behind or towed by the vehicle 12 by using a rear view camera or multi-camera surround view system (FIG. 1). A camera 16 is mounted at the rear end portion of the pulling vehicle 12. An image processor (such as a digital processor or field programmable gate array (FPGA) or digital signal processor (DSP) or application specific integrated circuit (ASIC) or camera imager system on chip (SOC) or other suitable processor or processing means) is operable to process the image data captured by the camera and, responsive to such processing of captured image data, determines the angle of the trailer in relation to the pulling vehicle in real time. The trailering assist system of the present invention is operable to determine the trailer angle as the vehicle is driven and turned, such as at corners or the like, along a road, as discussed below. The trailering assist system is operable to measure the trailer angle (see FIG. 2) between a tow vehicle and trailer using the rear view camera.

While reversing a vehicle that has trailer attached, it is difficult to control the trailer path especially for new or inexperienced drivers. As a result, the trailer may move toward an unintended direction which may lead to jackknifing the trailer. For controlled backing up of the vehicle with a trailer hitched to it, the backup assist system should calculate the angle of trailer with respect to vehicle center axis. Some known systems use a target (such as a checker board or known pattern) that is placed on a horizontal surface of the trailer whereby the system calculates trailer position and angle by detecting and tracking the target. For the systems with a target, the driver/end user has to place the target on the trailer body and the system has limitations with visibility of the target. Any partial blockage of the target, such as because of weather (including snow), strong shadows, glare from light sources or the like, can introduce inaccuracies in the system.

Figure 3:
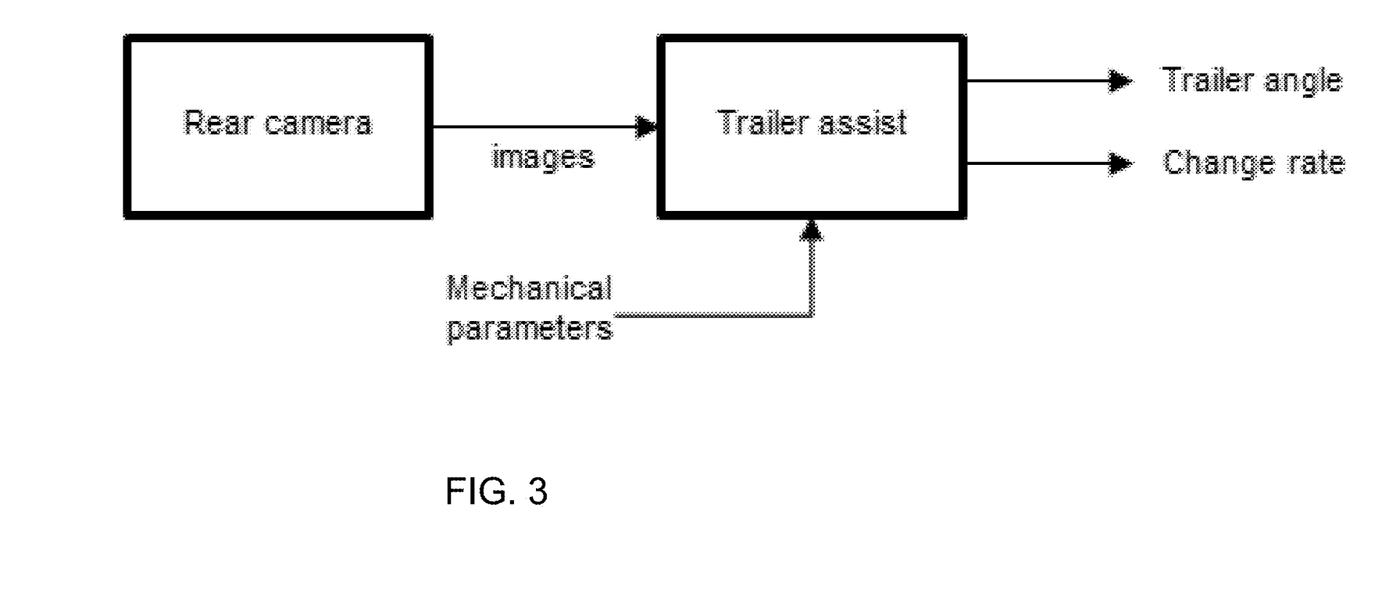
FIG. 3 is a block diagram of the trailering assist system of the present invention.

The system of the present invention is operable to detect the region with radial motion (trailer body/tongue), without any target attached to the trailer body. The system may extract a feature vector from the radial motion region, which will be used over frames of captured image data to detect the trailer region, without using vehicle motion. The system detects the tip of the stationary region (hitch ball), which moves along with the vehicle, and calculates a single reference point or multiple reference points with which the trailer angle will be calculated. As shown in FIG. 3, the rear camera captures image data representative of the scene with the target at the trailer, and the system processes the captured image data in accordance with the known mechanical parameters to determine the trailer angle and change rate.

Figure 4:
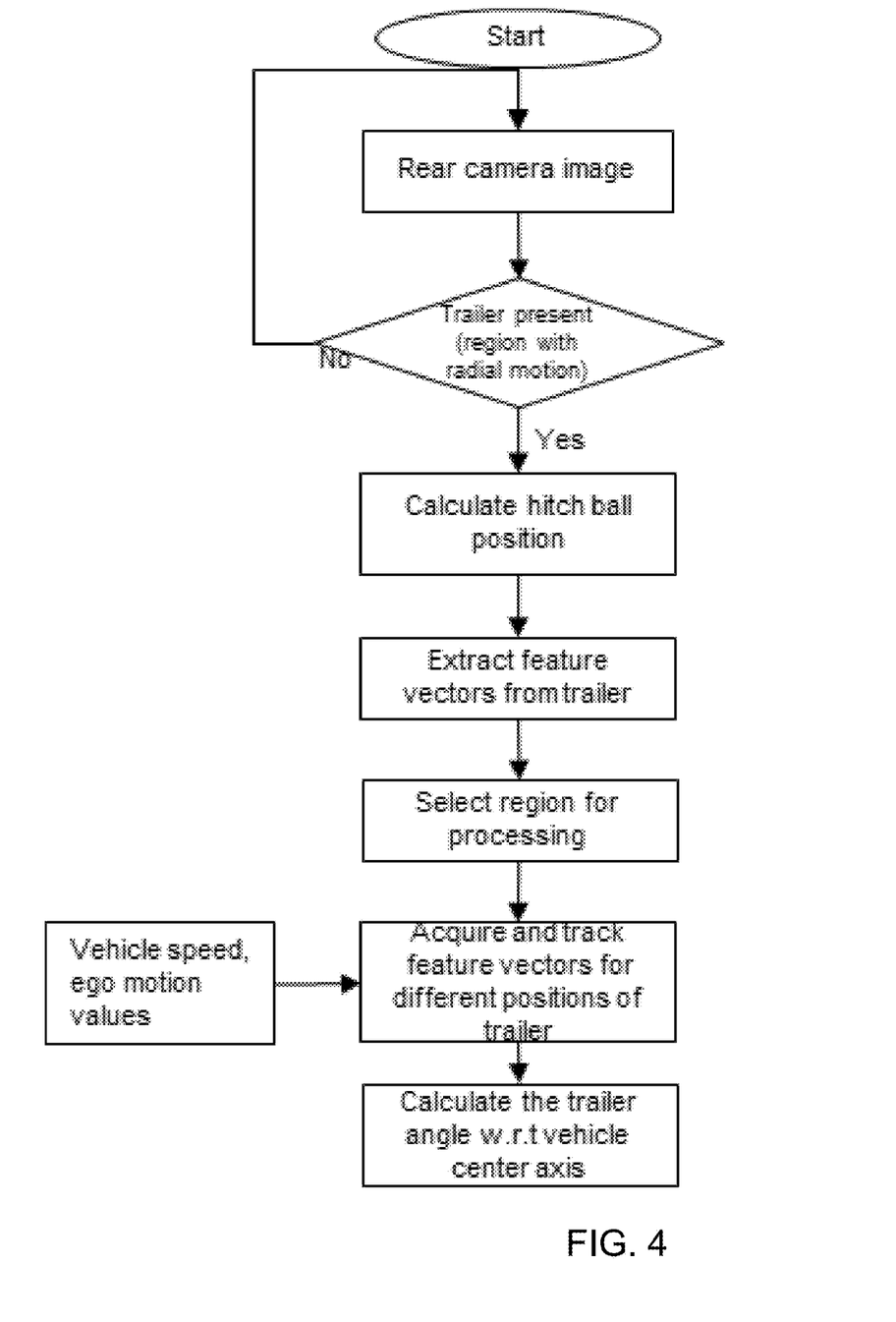
FIG. 4 is a flow chart of the image data processing in accordance with the trailering assist system of the present invention.

The system thus performs trailer detection, such as via the process shown in FIG. 4, to determine presence of a trailer at the rear of the vehicle. Using a motion pattern (horizontal and vertical) of pixels, the system detects the trailer region including trailer body and tongue that moves radially (relative to the hitch ball of the vehicle) in physical space, and the hitch ball region that moves along with the vehicle. The system extracts unique features from the trailer region that will be used over multiple frames of captured image data to match the trailer position within the frames of captured image data. The system confines the processing to a region of interest (ROI) created in the input image around the trailer in which the size and shape of the trailer features remains unchanged. This reduces processing time to acquire the trailer region.

The system acquires the trailer region within the ROI using features identified during the feature extraction phase. The system constructs/updates feature vectors for different positions of the trailer to limit the number of features. The system calculates centroid(s) for feature vectors with which the angle of the trailer will be measured. The system tracks the centroids with inputs of vehicle parameters including vehicle speed, acceleration and/or steering wheel angle. The system builds confidence to the tracker to avoid sudden drops in tracking and for a smaller ROI. The system is operable to detect the trailer angle with respect to the center line of the vehicle using the calculated centroid(s).

Therefore, the system may distinguish between the trailer region (including the trailer body and tongue) and the hitch ball positions using angular motion of the vehicle. The system measures the various distances including vehicle-to-hitch ball, hitch ball-to-centroid(s) of the trailer body and the camera-to-hitch ball. The system provides for detection of the presence of the trailer using motion patterns on different road surfaces including asphalt, concrete, dirt, gravel, grass, water, sand, snow and/or the like, and in different ambient conditions including daytime lighting conditions, dawn/dusk lighting conditions, nighttime lighting conditions with minimum light of 6 lux. The system determines/predicts the position of the trailer over time with the help of vehicle parameters and corresponding trailer location. The system thus avoids jackknifing the trailer by continuous detection and tracking of the trailer angle with respect to the vehicle center axis.

Therefore, the trailering assist system of the present invention automatically identifies the presence of a trailer attached at or hitched to the vehicle using angular motion of the trailer, and calculates the trailer position in physical space with respect to the hitch ball, so the user does not need to keep a target or known pattern on the trailer body. The trailer detection is independent of various climatic and ambient lighting conditions. The system extracts and constructs feature vectors for the trailer region at different positions, which reduces the processing time to detect trailer region. The system calculates multi point reference points (centroids) on the trailer region to reduce false positives and true negatives and to improve accuracy of the trailer angle calculation.

Figure 5:
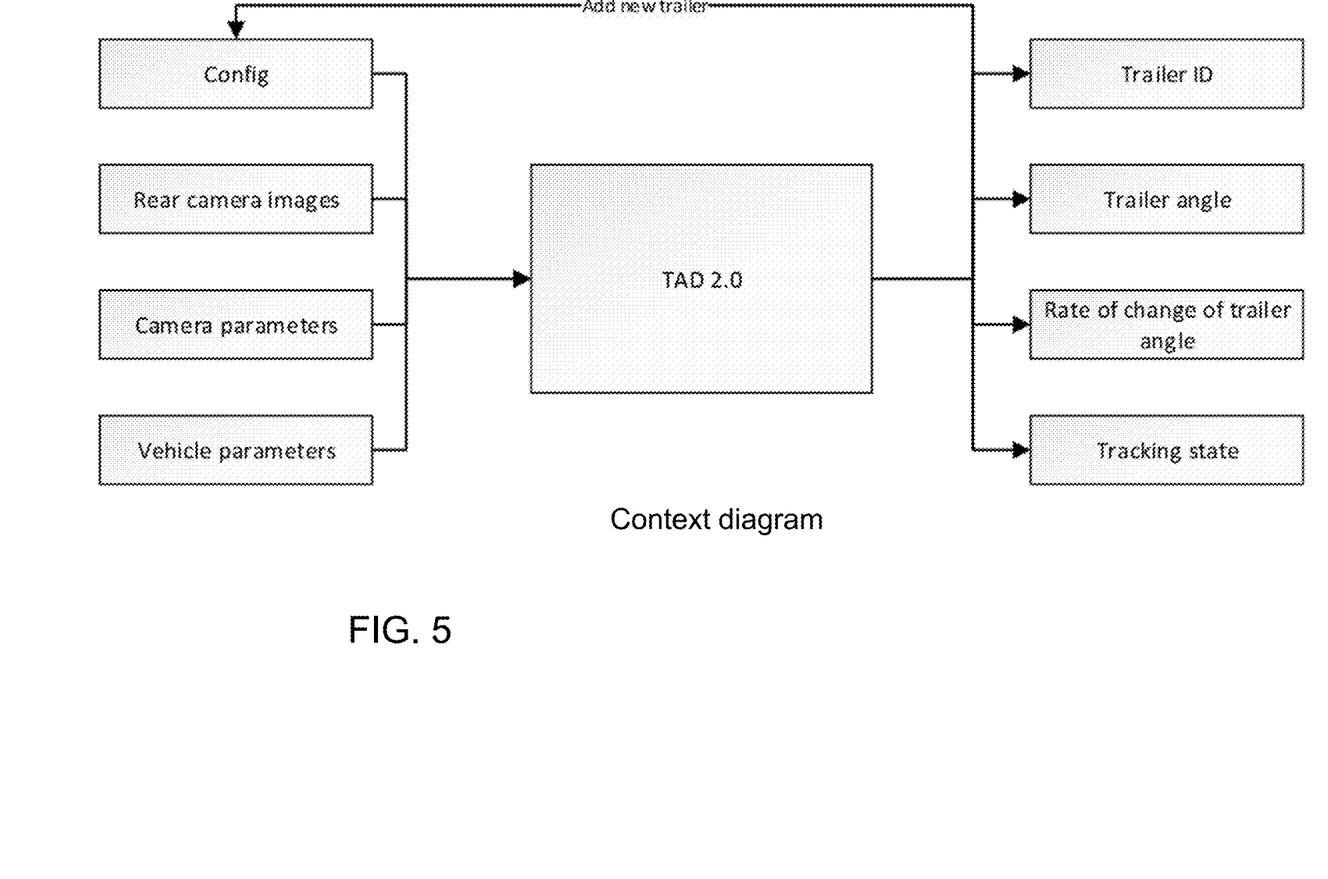
FIG. 5 is a context diagram of a trailering assist system of the present invention.
Figure 6:
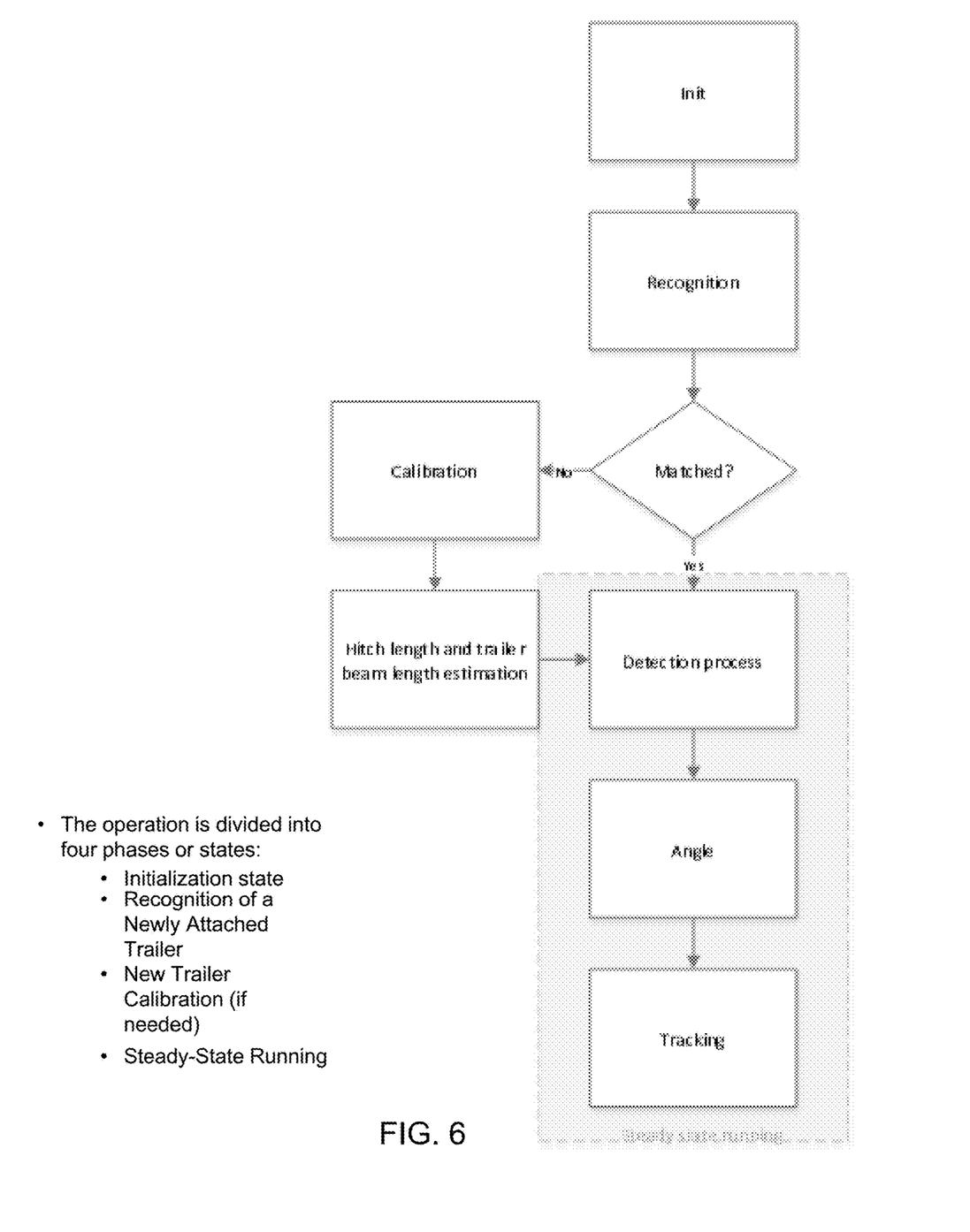
FIG. 6 is a flow chart showing operation of the trailering assist system of the present invention.

Optionally, and with reference to FIG. 5, the trailering assist system receives as input the video stream from the towing vehicle's backup camera, and the vehicle CAN data, including current vehicle velocity and steering wheel angle, and whether the trailer brake lights are currently connected. The system is responsible for delivering the current angle of the trailer with respect to the towing vehicle, the rate of change of that angle, and the tracking or tracking status or current status of the system. It also delivers the estimated length of the trailer, from hitch to trailer axle, and measures hitch length, at the time the trailer is first connected. As shown in FIG. 6, the operation of the system is divided into four phases or states: an initialization state, a recognition of a newly attached trailer state, a new trailer calibration state (if needed), and a steady-state running state.

State 1: Initialization State:

When the trailering assist or trailer angle detection system starts, it first enters a phase where it needs to detect whether or not a trailer is attached at or hitched to a hitch at the rear of the vehicle. The system identifies the presence of a trailer in the dynamic field of view (FOV) of the rear camera. The system measures the length of the hitch by locating the tip of the hitch. Pattern matching may be used to find the tip of the hitch, where recognizable patterns may include a circle, ellipse, square, rectangle, parabola and other polygonal shapes. This is the first step of locating the tip of the hitch using visual features.

Figure 7:
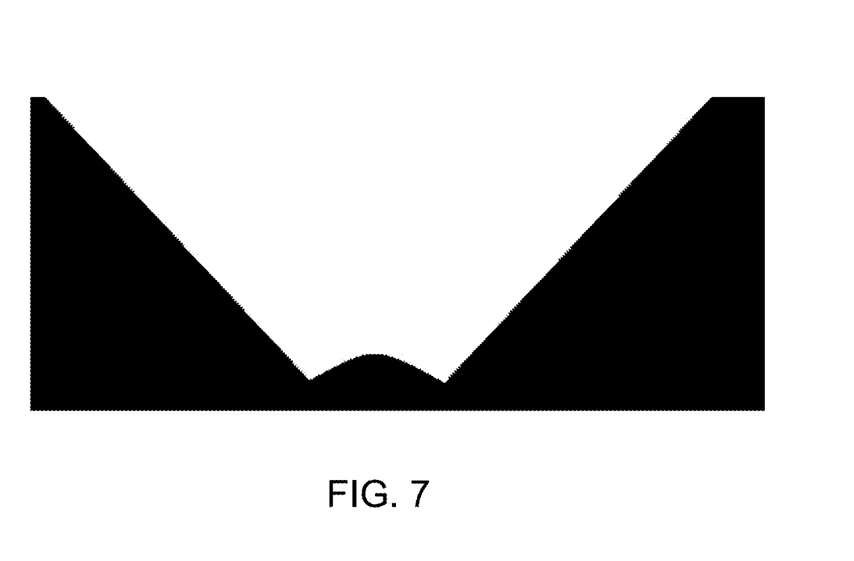
FIG. 7 is a diagram of the field of view that is processed for detecting the trailer, where features are detected only in the white regions, and not the black regions of the mask.

The field of view of the rear camera is centered around the tip of the hitch. This allows the system to measure trailer angle by analyzing the movement of visual features from the video frames of captured image data. The field of view is shown in FIG. 7, where features are detected only in the white regions, and not the black regions of the mask. The system rotates the field of view around the tip of hitch based on an output of the tracker (the expected location of the trailer). The system also identifies if the trailer is connected to the towing vehicle by processing image data captured by the rear camera and by vehicle CAN signals. When a trailer is attached/connected, the system proceeds to the Trailer Recognition phase.

State 2: Trailer Recognition:

The trailering assist system may initially identify or recognize the trailer or determine whether or not the particular trailer at the rear of the vehicle is a trailer for which the system is calibrated. If the system has been calibrated for that trailer, the system proceeds with the angle determination and tracking processes. If the system has not been calibrated for that trailer, the system proceeds first with a calibration stage, discussed below.

During the trailer recognition state, the system extracts the features that are a combination of patterns and other key feature points. These features are invariant to ambient light changes (for example, during nighttime lighting conditions, the system still recognizes a trailer that was calibrated during daytime lighting conditions), ground surface variations, and load changes on the trailer (for example, with/without a boat on a boat trailer, or with/without goods on a utility trailer).

These features are matched against stored features of each of the previously calibrated trailers and filtered, using the method of feature matching. For a particular calibrated trailer, the features are consolidated over the time, so that the system may learn in the background. This makes the system intelligent.

The feature matching and filtering is done for all previously calibrated trailers, such that a previously calibrated trailer that best matches the current video frame is selected as the candidate "recognized" trailer. If the percentage of trackable features remaining for the candidate is less than a preset threshold, the trailer viewed in the current video image frame is deemed to not match any of the previously calibrated trailers, and the system enters the new trailer calibration phase. If the candidate trailer matches at least as well as the threshold, the stored settings for that trailer, including the features to be tracked and the offset angle, are set as the reference image data, and the system enters the steady state running phase.

State 3: New Trailer Calibration:

If the system passes through the trailer recognition phase without any previously calibrated trailer being recognized as matching the current trailer image, the system starts a sequence of steps to locate the hitch ball and capture a set of feature descriptors while the trailer is at an angle of 0 degrees for use as a reference during steady state running. The system may prune those features to eliminate ones that are unreliable (likely not actually on the trailer), and estimates the length of the trailer from hitch ball to axle.

To calibrate a new (not recognized) trailer, the system, after collecting data on the trailer, collects data during a calibration drive, while the vehicle is driven straight ahead for several seconds (such as greater than three seconds or greater than five seconds), with the steering angle close to zero degrees. After driving straight ahead, the driver executes a turn, traveling either forwards or backwards, such that the trailer angle exceeds ±5 degrees.

The system measures the length of the hitch by locating the tip of the hitch. Based on the motion of the trailer while the vehicle is driven straight ahead and especially when turned, the hitch ball location can be refined based on the motion of the trailer. This is the second step of locating the tip of the hitch.

Figure 9:
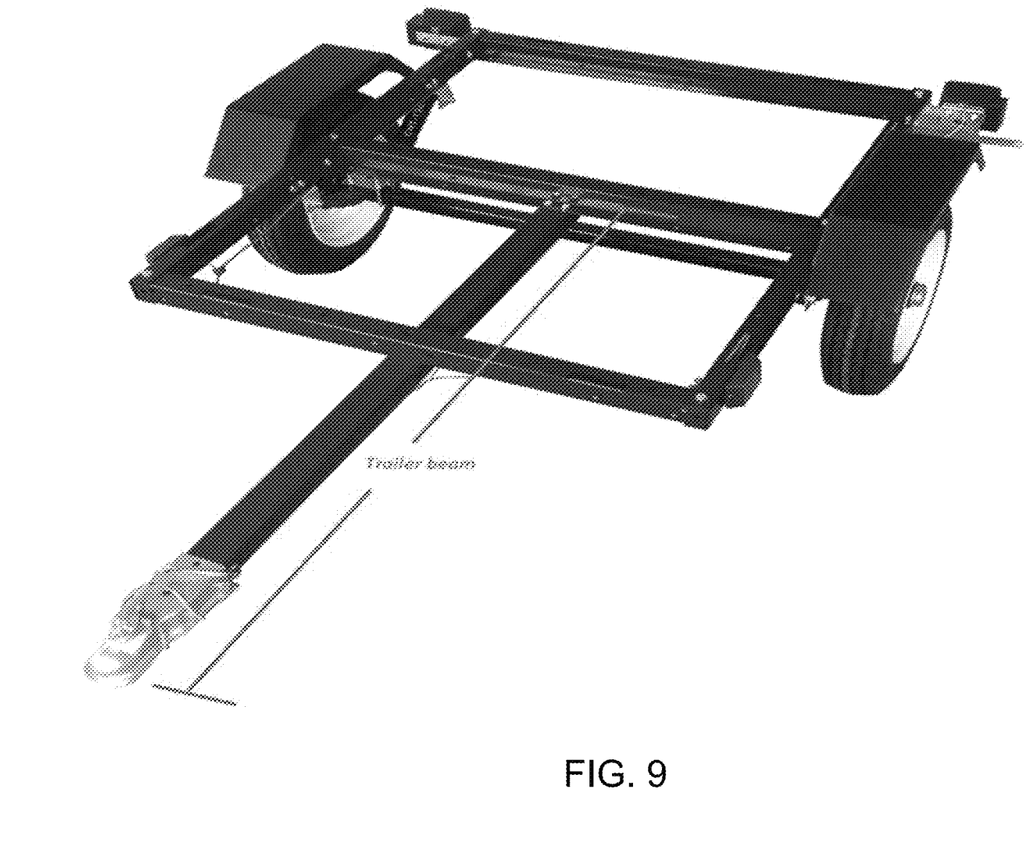
FIG. 9 is a perspective view of a trailer, showing the trailer beam length dimension for a single axle trailer.

The system may then estimate the trailer beam length, which is the longitudinal distance between the trailer tongue and the center of the trailer axle (see FIG. 9). If a trailer has multiple axles then it is the longitudinal distance along the trailer between the tow ball and the center of multiple axles of trailer. The system estimates the length of the trailer beam using the trailer angle, vehicle dynamics, and camera and system parameters.

The system finds or determines one or more zero degree reference frames of captured image data (and corresponding features) during a straight calibration drive.

All the collected data are then entered into the set of previously calibrated trailers (i.e., stored in memory), ready for use in future trailer recognitions. After the new trailer calibration phase is completed, the system enters the steady state running phase.

Estimate Trailer Beam Length:

The trailering assist or trailer angle detection system detects the trailer beam length of the trailer during calibration. As shown in FIG. 9, the trailer beam length is the distance between the tow ball or hitch ball or tongue of the trailer and a center axis of the trailer axle. If a trailer has multiple axles, then the trailer beam length is the distance between the tongue and the center of the multiple axles of the trailer. That is, if a trailer has more than one axle, then the trailer beam length is the longitudinal distance along the trailer between the tow ball and a point halfway between the center line or axis of the forwardmost axle and the rearwardmost axle.

The system, in some implementations, uses a trailer kinematic model to predict trailer angles with trailer dimensions. Prerequisites for the trailer kinematic model include maximum wheel angle, wheel base, and speed of the towing vehicle and the hitch length (i.e., the distance from the center of the rear wheel axle of the towing vehicle to the center of the hitch ball).

The system, in some implementations, uses a visual angle detector to determine the trailer angle of the hitched trailer relative to the vehicle. Prerequisites for a visual angle detector include a rear view image (e.g., captured by the camera 16 at the rear of the vehicle), wheel angle and speed from the towing vehicle. In some examples, the wheel angle and speed are determined via image processing of captured image data, while in other examples the wheel angle and speed are received from other sensors.

The calibration process includes the combination of two maneuvers: driving the vehicle straight ahead and making a turn with the vehicle. The trailering assist system assumes a baseline or initial length dimension estimate (such as, for example, 200 cm) as the initial value for the trailer beam length before starting the calibration process. The towing vehicle is then driven straight in the forward direction (e.g., at a speed greater than 0 KPH) until the system confirms that the rate of change of the observed or determined or monitored trailer angle from the visual angle detector are less than a first threshold rate of change (e.g., minimal or close to zero degrees per second). For example, the first threshold rate of change may be less than two degrees per second, such as one degree per second. That is, the vehicle is driven straight causing the trailer to also straighten behind the vehicle until the determined trailer angle is less than a threshold angle (e.g., about 5 degrees or 1 degree).

The vehicle then begins a turn by keeping the steering wheel at a fixed angle (e.g., greater than ±5 degrees, such as, for example, about 10 degrees) and moving forward. The vehicle continues the turn until the system confirms that the rate of change of the observed or determined trailer angle from the visual angle detector becomes less than a second threshold rate of change (e.g., minimal or close to zero degrees per second). For example, the second threshold rate of change may be less than two degrees per second, such as one degree per second. The second threshold rate of change may be the same or different than the first threshold rate of change. For example, the vehicle may continue to turn until the trailer angle changes less than the second threshold amount of degrees (e.g., ±1 degree) over a threshold amount of time (e.g., 1 second). As the vehicle maintains a turn with a constant angle, the trailer will eventually turn at a steady angle.

The system then iteratively executes or runs the trailer kinematic model to predict trailer angles with a plurality of various different potential trailer beam lengths at either side of the baseline length dimension (such as various trailer beam lengths ranging from 20 cm to 2,000 cm (in half splits)). That is, the system may predict a plurality of trailer angle based on results from iterations of the trailer kinematic model with successively shorter/longer potential beam lengths (starting from the initial beam length estimate). The system then finds the predicted trailer angle that least deviates from the current determined or observed trailer angle (i.e., the determined trailer angle after the rate of change is less than the second threshold rate of change) and determines the corresponding potential trailer beam length to be the final estimated trailer beam length. The system may store the final estimated trailer beam length (i.e., in non-volatile memory) for future use. That is, the system may retrieve the final estimated trailer beam length from memory to reuse when the system determines that the trailer has already been calibrated State 4: Steady State Running:

Once a trailer has been recognized or newly calibrated, the trailering assist system is ready to begin normal operation, referred to herein as steady state running. In steady state running, the trailering assist system starts producing an estimated trailer angle and angular rate of change, along with the system status, for each input video frame of captured image data.

Two different approaches are used in concert to calculate the trailer angle. A kinematic model of the movement of a car and trailer is used, and an analysis of the movement of visual features from the video frame, relative to a reference frame, is used.

The kinematic model provides an estimate based on the geometries of the towing vehicle and trailer, the steering angle, and the velocity. This estimate produces smoothly changing output, but drifts over time away from the actual trailer angle. The angle determination based on analysis of each video frame relative to a reference produces results that are subject to greater noise than the kinematic model, but are not subject to the cumulative drift.

Data from both approaches are combined in a prediction and correction filters. The trailering assist system's output comes from the smoothing filter, and is more accurate than the kinematic model and smoother than the raw measurements.

4A. Feature Detection and Tracking:

In order to track the movement of the trailer in video stream, the trailering assist system uses several algorithms developed for computer vision to calculate how much angular difference there is between the current video frame and the reference frame. To improve accuracy, the trailering assist system also implements a mechanism to update the reference frame as the trailer changes angle, giving the matching algorithm the most opportunity to find and track features on the trailer. The trailering assist system uses features that are a combination of patterns and key points to analyze the current video frame and find visual features that are distinctive enough to track from one frame to the next. The system limits the detection of features within the dynamic field of view (FOV) of the camera.

4B. Feature Matching:

The algorithm takes the set of features separately detected in the current frame and the reference frame, and finds the correspondence. This produces a set of feature references that are deemed to have matched.

4C. Feature Filtering:

The features represented may be deemed to "match", but some of them may not actually be part of the trailer, despite the use of the dynamic mask. To eliminate those feature matches that are not actually part of the trailer, some filtering steps are taken based on the behavior of trailer.

For example, the system may filter by conditions. One condition is based on the fact that trailer features will rotate around the hitch ball as the towing vehicle and trailer turn, whereas features not on the trailer (e.g., on the ground) move independently of the hitch ball. Another condition is that trailer features do not change much in size properties. Another condition is that matched features that are on the trailer will have similar vector angles or low angular differences in position between the current and the reference frame, while matched features not on the trailer will have random angular changes or differences or dissimilar angular differences of vectors of features over multiple frames of captured image data. For example, features determined on a trailer, as the trailer moves relative to the vehicle (such as during a turning maneuver of the vehicle and trailer) will have similar angular feature vectors (and thus the differences between the vector angles will be low and similar or non-random) in that the features move together relative to the vehicle, while features that are not indicative of features on the trailer, such as features of an object on the ground, will have dissimilar or random angular differences or changes as they move over multiple frames of captured image data, due to the non-uniform movement of the vehicle relative to the object, with the field of view of the camera changing relative to the object. The features that remain after filtering will be consolidated over the time. This improves the robustness of the system.

4D. Measurement of Angle:

For features that survive the filtering, the mean angular difference is calculated, resulting in a consensus angle that the frame differs from the reference frame. The absolute measured angle of the trailer is the consensus angle computed above, plus the offset angle for the current reference image. If at least one features survives the filtering, the frame is deemed a "good frame", and the consensus angle is used to update the predictive filter.

4E. Multiple Reference Images:

To improve the accuracy of computed angles, it is advantageous to have a reference image of the trailer that is similar in angle to the current frame image. The trailering assist system implements a set of reference descriptors at fixed angles. The number of segments is a configurable parameter.

Figure 8:
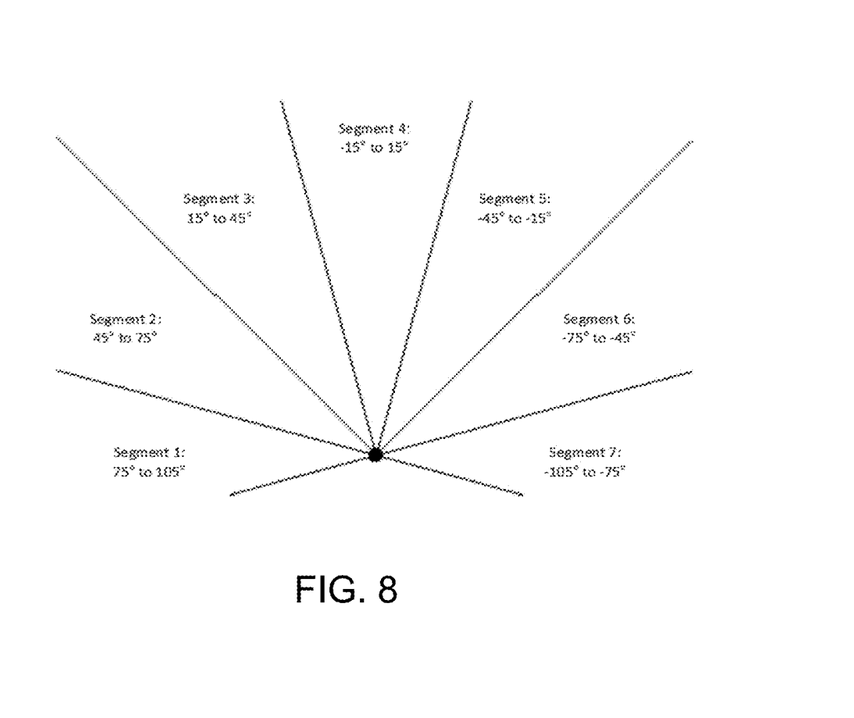
FIG. 8 is a schematic showing a set of seven angular segments, each serving a range of 30 degrees.

For example, FIG. 8 shows a set that consists of seven segments, each serving a range of 30 degrees. Optionally, the system may utilize a greater number of segments to enhance the angle accuracy.

As the vehicle turns and the trailer angle changes, the system selects the reference descriptor for the segment within which the previous frame angle falls, making it the current descriptor, and using it for feature matching. The reference descriptor set data structure includes, in addition to the features and their locations, the angle of the frame image, known as the offset angle. This offset angle is near to the center angle of the segment. As the trailer angle changes, whenever the segment's center angle is crossed, the reference image data (from a reference frame of captured image data) for that segment are updated with the already computed feature data from the previous consolidated good frames of captured image data. This mechanism, which is periodically updating the reference image as the vehicle and trailer move, serves to improve the ability of the feature matcher to find matches, especially as lighting changes.

The system may utilize aspects of the trailering assist or trailer angle detection systems described in U.S. Pat. Nos. 9,085,261 and/or 6,690,268, and/or U.S. Publication Nos. US-2019-0016264; US-2018-0276838; US-2018-0253608; US-2018-0215382; US-2017-0254873; US-2017-0217372; US-2017-0050672; US-2015-0217693; US-2014-0160276; US-2014-0085472 and/or US-2015-0002670, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of calibrating a vehicular trailering assist system, the method comprising:

hitching a trailer to a vehicle equipped with the vehicular trailering assist system, the vehicle having a camera disposed at a rear portion of the vehicle so as to have a field of view exterior and rearward of the vehicle;

wherein the trailer has a tongue that is hitched to a hitch at the rear of the vehicle, and wherein the trailer has a trailer beam length that is a longitudinal distance along the trailer between the tongue of the trailer and a center of an axle of the trailer;

determining, via processing by an image processor of the vehicle frames of image data captured by the camera when the vehicle is towing the trailer, presence of the trailer hitched to the vehicle;

responsive to determination of presence of the trailer hitched to the vehicle, determining, via the vehicular trailering assist system, if the trailer that is hitched to the vehicle is a trailer for which the vehicular trailering assist system is calibrated;

responsive to determination by the vehicular trailering assist system that the trailer that is hitched to the vehicle is not a trailer for which the vehicular trailering assist system is calibrated, assigning, via the vehicular trailering assist system, an initial trailer beam length;

after assigning the initial trailer beam length, and during a calibration drive of the vehicle towing the trailer, determining, via a visual angle detector of the vehicular trailering assist system and based at least on processing by the image processor of frames of image data captured by the camera, trailer angles of the trailer relative to the vehicle;

during the calibration drive, determining, via the vehicular trailering assist system, when a rate of change of the determined trailer angles is less than a first threshold rate of change while the vehicle is driven straight in a forward direction;

during the calibration drive, determining, via the vehicular trailering assist system, that the rate of change of the determined trailer angles is less than a second threshold rate of change while the vehicle is driven forward and turned by keeping a steering wheel of the vehicle at a fixed angle;

iteratively predicting, via the vehicular trailering assist system, a plurality of predicted trailer angles based on a corresponding plurality of potential trailer beam lengths ranging between an upper dimension above the initial trailer beam length and a lower dimension below the initial trailer beam length;

selecting, via the vehicular trailering assist system, a trailer angle from the plurality of predicted trailer angles that least deviates from the current determined trailer angle while the vehicle is driven; and determining that the potential trailer beam length that corresponds to the selected trailer angle that least deviates from the current determined trailer angle is a final estimated trailer beam length for use by the vehicular trailering assist system in determining trailer angles when the vehicle is driven while towing the trailer.

2. The method of claim 1, storing the final estimated trailer beam length for the trailer in memory.

3. The method of claim 2, wherein the final estimated trailer beam length stored in memory is used by the vehicular trailering assist system in determining trailer angles for the trailer during future drives of the vehicle when towing that trailer.

4. The method of claim 1, wherein the initial trailer beam length is 200 cm, and wherein a range of the plurality of potential trailer beam lengths is between 20 cm and 2,000 cm.

5. The method of claim 1, wherein determining, via the visual angle detector, the trailer angles of the trailer is performed without use of a target on the trailer.

6. The method of claim 1, comprising generating, via the vehicular trailering assist system, and based at least in part on the final estimated trailer beam length, a set of trailer parameters for the trailer and storing the set of trailer parameters in memory for use in future trailer recognition.

7. The method of claim 1, wherein determining, via the visual angle detector, trailer angles of the trailer relative to the vehicle is independent of lighting conditions at the vehicle and trailer.

8. The method of claim 1, wherein determining, via the visual angle detector, trailer angles of the trailer relative to the vehicle is independent of road surfaces along which the vehicle is towing the trailer.

9. The method of claim 1, comprising determining, via the vehicular trailering assist system, and at least in part via processing by the image processor of frames of captured image data, multiple reference points at a trailer region to reduce false positives and improve accuracy of trailer angle determination by the vehicular trailering assist system.

10. The method of claim 1, wherein the first threshold rate of change is close to zero degrees per second.

11. The method of claim 1, wherein the second threshold rate of change is close to zero degrees per second.

12. The method of claim 1, wherein the first threshold rate of change is less than two degrees per second.

13. The method of claim 1, wherein the first threshold rate of change is 1 degree per second.

14. The method of claim 1, wherein the second threshold rate of change is less than two degrees per second.

15. The method of claim 1, wherein the first threshold rate of change is equal to the second threshold rate of change.

16. The method of claim 1, wherein, during future drives of the vehicle and trailer, the vehicular trailering assist system determines, via processing by the image processor of frames of captured image data, feature vectors of the trailer by determining, via processing by the image processor of frames of captured image data, features that have similar angular changes between a current frame of image data captured by the camera and a previous frame of image data captured by the camera, and wherein the vehicular trailering assist system detects features that are not indicative of feature vectors of the trailer responsive at least in part to determining, via processing by the image processor of frames of captured image data, that vectors of the detected features have dissimilar angular changes between the current frame of image data captured by the camera and the previous frame of image data captured by the camera, and wherein, responsive to movement of the trailer relative to the vehicle, and via processing by the image processor of frames of captured image data, the vehicular trailering assist system tracks determined feature vectors over multiple frames of captured image data for different positions of the trailer relative to the vehicle, and wherein the vehicular trailering assist system determines angle of the trailer relative to the vehicle responsive to tracking of determined feature vectors of the trailer present in the field of view of the camera over multiple frames of captured image data.

17. The method of claim 16, wherein the vehicular trailering assist system determines a mean angular change of the determined feature vectors from a reference frame of captured image data to a current frame of captured image data, and wherein determination of the mean angular change of the determined feature vectors results in a determined change in trailer angle from the reference frame of captured image data.

18. The method of claim 17, wherein the visual angle detector determines the trailer angle of the trailer relative to the vehicle by combining the determined change in trailer angle with an offset angle for the reference frame of captured image data.

19. A method of calibrating a vehicular trailering assist system, the method comprising:

hitching a trailer to a vehicle equipped with the vehicular trailering assist system, the vehicle having a camera disposed at a rear portion of the vehicle so as to have a field of view exterior and rearward of the vehicle;

wherein the trailer has a tongue that is hitched to a hitch at the rear of the vehicle, and wherein the trailer has a trailer beam length that is a longitudinal distance along the trailer between the tongue of the trailer and a center of an axle of the trailer;

determining, via processing by an image processor of the vehicle frames of image data captured by the camera when the vehicle is towing the trailer, presence of the trailer hitched to the vehicle;

responsive to determination of presence of the trailer hitched to the vehicle, determining, via the vehicular trailering assist system, if the trailer that is hitched to the vehicle is a trailer for which the vehicular trailering assist system is calibrated;

responsive to determination by the vehicular trailering assist system that the trailer that is hitched to the vehicle is not a trailer for which the vehicular trailering assist system is calibrated, assigning, via the vehicular trailering assist system, an initial trailer beam length;

after assigning the initial trailer beam length, and during a calibration drive of the vehicle towing the trailer, determining, via a visual angle detector of the vehicular trailering assist system and based at least on processing by the image processor of frames of image data captured by the camera, trailer angles of the trailer relative to the vehicle;

wherein determining, via the visual angle detector, the trailer angles of the trailer is performed without use of a target on the trailer;

during the calibration drive, determining, via the vehicular trailering assist system, when a rate of change of the determined trailer angles is less than a first threshold rate of change while the vehicle is driven straight in a forward direction;

during the calibration drive, determining, via the vehicular trailering assist system, that the rate of change of the determined trailer angles is less than a second threshold rate of change while the vehicle is driven forward and turned by keeping a steering wheel of the vehicle at a fixed angle;

iteratively predicting, via the vehicular trailering assist system, a plurality of predicted trailer angles based on a corresponding plurality of potential trailer beam lengths ranging between an upper dimension above the initial trailer beam length and a lower dimension below the initial trailer beam length;

selecting, via the vehicular trailering assist system, a trailer angle from the plurality of predicted trailer angles that least deviates from the current determined trailer angle while the vehicle is driven;

determining that the potential trailer beam length that corresponds to the selected trailer angle that least deviates from the current determined trailer angle is a final estimated trailer beam length for use by the vehicular trailering assist system in determining trailer angles when the vehicle is driven while towing the trailer; and storing the final estimated trailer beam length for the trailer in memory for use by the vehicular trailering assist system in determining trailer angles for the trailer during future drives of the vehicle when towing that trailer.

20. The method of claim 19, wherein the initial trailer beam length is 200 cm, and wherein a range of the plurality of potential trailer beam lengths is between 20 cm and 2,000 cm.

21. The method of claim 19, wherein the first threshold rate of change is less than two degrees per second.

22. The method of claim 19, wherein the second threshold rate of change is less than two degrees per second.

23. A method of calibrating a vehicular trailering assist system, the method comprising:

hitching a trailer to a vehicle equipped with the vehicular trailering assist system, the vehicle having a camera disposed at a rear portion of the vehicle so as to have a field of view exterior and rearward of the vehicle;

wherein the trailer has a tongue that is hitched to a hitch at the rear of the vehicle, and wherein the trailer has a trailer beam length that is a longitudinal distance along the trailer between the tongue of the trailer and a center of an axle of the trailer;

determining, via processing by an image processor of the vehicle frames of image data captured by the camera when the vehicle is towing the trailer, presence of the trailer hitched to the vehicle;

responsive to determination of presence of the trailer hitched to the vehicle, determining, via the vehicular trailering assist system, if the trailer that is hitched to the vehicle is a trailer for which the vehicular trailering assist system is calibrated;

responsive to determination by the vehicular trailering assist system that the trailer that is hitched to the vehicle is not a trailer for which the vehicular trailering assist system is calibrated, assigning, via the vehicular trailering assist system, an initial trailer beam length;

after assigning the initial trailer beam length, and during a calibration drive of the vehicle towing the trailer, determining, via a visual angle detector of the vehicular trailering assist system and based at least on processing by the image processor of frames of image data captured by the camera, trailer angles of the trailer relative to the vehicle;

wherein determining, via the visual angle detector, the trailer angles of the trailer is performed without use of a target on the trailer;

during the calibration drive, determining, via the vehicular trailering assist system, when a rate of change of the determined trailer angles is less than a first threshold rate of change while the vehicle is driven straight in a forward direction;

during the calibration drive, determining, via the vehicular trailering assist system, that the rate of change of the determined trailer angles is less than a second threshold rate of change while the vehicle is driven forward and turned by keeping a steering wheel of the vehicle at a fixed angle;

iteratively predicting, via the vehicular trailering assist system, a plurality of predicted trailer angles based on a corresponding plurality of potential trailer beam lengths ranging between an upper dimension above the initial trailer beam length and a lower dimension below the initial trailer beam length;

selecting, via the vehicular trailering assist system, a trailer angle from the plurality of predicted trailer angles that least deviates from the current determined trailer angle while the vehicle is driven;

determining that the potential trailer beam length that corresponds to the selected trailer angle that least deviates from the current determined trailer angle is a final estimated trailer beam length for use by the vehicular trailering assist system in determining trailer angles when the vehicle is driven while towing the trailer; and generating, via the vehicular trailering assist system, and based at least in part on the final estimated trailer beam length, a set of trailer parameters for the trailer and storing the set of trailer parameters in memory for use in future trailer recognition.

24. The method of claim 23, wherein the initial trailer beam length is 200 cm, and wherein a range of the plurality of potential trailer beam lengths is between 20 cm and 2,000 cm.

25. The method of claim 23, wherein the first threshold rate of change is less than two degrees per second.

26. The method of claim 23, wherein the second threshold rate of change is less than two degrees per second.

27. The method of claim 23, comprising storing the final estimated trailer beam length for the trailer in memory for use by the vehicular trailering assist system in determining trailer angles for the trailer during future drives of the vehicle when towing that trailer.

* * * * *